H. MORE.
Milk-Strainer.

No. 203,847.        Patented May 21, 1878.

Witnesses
C. L. Hoffman
A. V. Pitts

Inventor
Hiram More

UNITED STATES PATENT OFFICE.

HIRAM MORE, OF CHICAGO, ILLINOIS.

IMPROVEMENT IN MILK-STRAINERS.

Specification forming part of Letters Patent No. 203,847, dated May 21, 1878; application filed March 7, 1878.

*To all whom it may concern:*

Be it known that I, HIRAM MORE, of the city of Chicago, in the county of Cook and State of Illinois, have invented certain new and useful Improvements in Devices for Straining or Filtering Milk or other Liquids; and I hereby declare the following to be such a full, clear, and exact description of the device as will enable others to construct and use the same, reference being had to the accompanying drawings, and to the letters of reference placed thereon, similar letters indicating like parts in the different figures.

Figure 1:
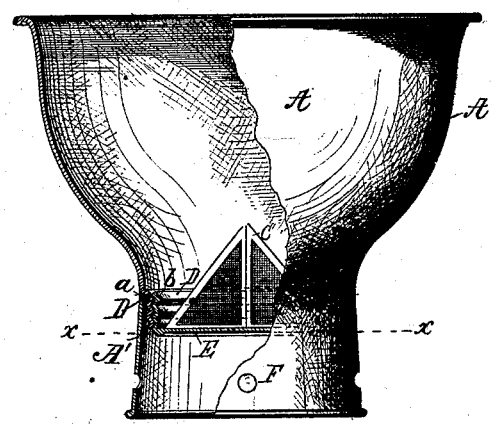
Figure 2:
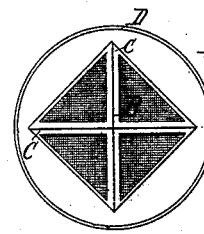
Figure 3:
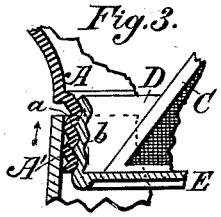

Figure 1 is a side view of my improved strainer, partly in section. Fig. 2 is a top view of the same on line $x\ x$ Fig. 1.

The object of this invention is to so improve the portable milk-strainer for which Letters Patent No. 185,866 were granted to me on the 2d day of January, 1877, as to greatly increase its durability and efficiency, which I accomplish by changing the form of the strainer from a cone to a pyramid, and supplying it with a screw-thread at its base, by means of which it may be readily attached or detached from the milk-receiver for the purpose of cleansing it from impurities after use; and, further, by providing the strainer with an adjustable rest, for use when straining milk into pans or other shallow receptacles.

A represents the milk-receiver, which is preferably of the shape of an inverted conical frustum or bowl, made without seam, and provided at its smaller end with a cylindrical extension, A', within which is formed the screw-thread $a$, which receives a corresponding thread, $b$, upon the base of the pyramidal strainer B. This strainer is constructed by securing to the base three or more supports, $c$, of triangular section, which incline toward each other, uniting in a point at the top, thus forming a firm and durable frame for the reception of the covering of wire-cloth, which constitutes the filtering medium. This cloth is made from wire of brass, or other alloy not easily corroded, and should be very fine in its texture—ten thousand perforations, or more, to the square inch are preferred.

In order to apply this cloth to the frame, it is cut into triangular pieces suiting the spaces between the supports $c$, and is then placed upon the supports and securely soldered thereto, thus giving the cloth frequent and firm points of attachment, which perfectly prevent it from sagging or stretching, so as to increase the size of the openings through it, which has proved to be the greatest practical difficulty encountered in the conical strainers. The triangular section of the supports $c$ causes them to present a smooth surface without sharp angles on the inside of the strainer, rendering the task of keeping it clean a light one compared with others of different construction.

An additional attachment, for use when straining milk into pans or other shallow vessels, is shown in the adjustable telescopic rest F, which slides over the cylindrical part A' of the receiver, and supports the milk receiver and strainer above the level of the milk when the pan is full.

When the strainer is to be cleaned it may be unscrewed from the milk-receiver, reversed, and water poured into the open end, which readily forces all sediment from the wire meshes. The rest F is also very useful, as it prevents that portion of the device in which the dirty and extraneous matters collect from being immersed in the strained milk as the pan or other receptacle fills up.

Having thus described my invention, I claim as new, and desire to secure by Letters Patent, the following:

1. The pyramidal strainer B, provided with a screw-thread around its base, in combination with the milk-receiver A and its extension A', the latter having a corresponding screw-thread for the reception of the strainer B, substantially as and for the purpose set forth.

2. The telescopic rest F, in combination with the extension A' of the milk-receiver, as and for the purpose set forth.

HIRAM MORE.

Witnesses:
GEORGE L. GOODRICH,
GEO. E. FOSS.